United States Patent [19]

Cheng et al.

[11] Patent Number: 6,051,521

[45] Date of Patent: Apr. 18, 2000

[54] METHOD OF PRODUCING AN AROMATICS ALKYLATION CATALYST

[75] Inventors: Jane C. Cheng, Voorhees; Hye Kyung C. Timken, Woodbury, both of N.J.

[73] Assignee: Mobil Oil Corporation, Fairfax, Va.

[21] Appl. No.: 09/139,226

[22] Filed: Aug. 25, 1998

[51] Int. Cl.[7] .................................................. B01J 29/04
[52] U.S. Cl. ................................. 502/86; 502/60; 502/64
[58] Field of Search ................................. 502/60, 64, 86, 502/238; 423/328.2

[56] References Cited

U.S. PATENT DOCUMENTS 5,840,988  11/1998  Eller et al. .............................. 564/585

*Primary Examiner*—Tom Dunn
*Assistant Examiner*—Christine Ildebrando
*Attorney, Agent, or Firm*—Peter W. Roberts

[57] ABSTRACT

This invention provides a method of producing an aromatics alkylation catalyst comprising the steps of:

(a) synthesizing a layered oxide material MCM-56 in the presence of alkali and/or alkaline earth metal cations;

(b) prior to any calcination of the MCM-56, subjecting the MCM-56 produced in step (a) to ammonium ion exchange so as to at least partially replace the alkaline or alkaline earth metal cations associated with the MCM-56 with ammonium ions; then (c) heating the ammonium-exchanged MCM-56 to decompose the ammonium cations and convert the MCM-56 into the hydrogen form; and (d) after step (b), forming the MCM-56 into catalyst particles.

The resultant catalyst exhibits enhanced activity in the alkylation of benzene with ethylene and propylene.

3 Claims, No Drawings

METHOD OF PRODUCING AN AROMATICS ALKYLATION CATALYST

This invention relates to a method of producing an aromatics alkylation catalyst containing the layered material MCM-56 and to the use of the resultant catalyst in aromatics alkylation.

BACKGROUND TO THE INVENTION

Aromatics alkylation provides an important commercial route to a number of industrial chemicals. For example, ethylbenzene is a valuable commodity chemical used for the production of styrene and is produced commercially by the alkylation of benzene with ethylene. Similarly, cumene, which is used as a precursor in the production of phenol, is produced commercially by the alkylation of benzene with propylene.

In the past solid phosphoric acid and Freidel Crafts catalysts, particularly aluminum chloride, were used to catalyse the alkylation of aromatic compounds with alkylating agents, such as ethylene and propylene. More recently, however, these conventional catalysts have been increasingly replaced by zeolitic materials. For example, the well known Mobil/Badger ethylbenzene process (see *Oil and Gas Journal*, volume 7, 1977, pages 58–61) is a vapor phase process for producing ethylbenzene by reaction of ethylene with benzene over the zeolite ZSM-5. Today, other zeolites, most notably MCM-22, are beginning to replace ZSM-5 as the preferred aromatics alkylation catalysts particularly in view of their enhanced selectivity to the desired monoalkylated product and their ability to operate at less severe, liquid phase conditions. For example, U.S. Pat. No. 4,992,606 discloses the use of the zeolite MCM-22 in the alkylation of aromatic compounds with short chain (having 1 to 5 carbon atoms) alkylating agents.

MCM-56 is a layered oxide material, rather than a three-dimensionally ordered zeolite, in which each layer in MCM-56 is porous and has a framework structure closely related to that of MCM-22. MCM-56 and its synthesis are described in U.S. Pat. No. 5,362,697. U.S. Pat. No. 5,453,554 discloses the use of MCM-56 as a catalyst in the alkylation of aromatic compounds with short chain (having 1 to 5 carbon atoms) alkylating agents. As disclosed in FIGS. 6 and 7 of U.S. Pat. No. 5,453,554, MCM-56 offers potential advantages over MCM-22 for the production of ethylbenzene and cumene, particularly under liquid phase conditions, since MCM-56 is a more active alkylation catalyst than its zeolitic counterpart MCM-22. The entire disclosures of U.S. Pat. Nos. 5,362,697 and 5,453,554 are incorporated herein by reference.

MCM-56 has a chemical composition which can be represented by the formula:

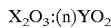

wherein X is a trivalent element, such as aluminum, boron, iron and/or gallium, preferably aluminum, Y is a tetravalent element, such as silicon and/or germanium, preferably silicon, and n is less than 35, typically from 5 to 25, preferably from 10 to 20 and most preferably from 13 to 18. As-synthesized, MCM-56 has the following formula, on an anhydrous basis:

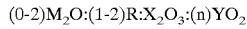

wherein M is an alkali and/or alkaline earth metal and R is an organic moiety and wherein the M and R components are associated with the material as a result of their presence during the synthesis of the MCM-56.

When MCM-56 is to be used as an aromatics alkylation catalyst, the organic moiety R is removed, normally by calcination, and the alkali and/or alkaline earth metal M, which would otherwise render the material catalytically inactive, is replaced, normally by the hydrogen cation. As disclosed in Example 11 of U.S. Pat. No. 5,453,554, preparation of an aromatics alkylation catalyst from as-synthesized MCM-56 typically involves mixing the material with an inorganic oxide binder, normally alumina, and then extruding the mixture into catalyst particles of the required shape. The resultant catalyst particles are then dried at about 120° C. and then contacted with ammonium nitrate solution so that the alkaline and/or alkaline earth metal cations are at least partially replaced by ammonium cations. The exchanged catalyst particles are rinsed with water, dried and then calcined at about 540° C. to convert the MCM-56 to the hydrogen form and remove the organic moiety R.

According to the invention, it has now been found that, if the ammonium exchange is effected prior to any calcination and catalyst particle formation, the activity of the resultant MCM-56 catalyst is surprisingly and significantly increased as compared to that obtained using the method described in U.S. Pat. No. 5,453,554. While the reason for this enhanced activity is not fully understood, it is believed that the alkali and/or alkaline earth metal becomes locked within the framework structure of the MCM-56 during catalyst particle formation and/or subsequent drying of the catalyst particles, making its subsequent removal by ammonium exchange much more difficult. By effecting the ammonium exchange prior to catalyst particle formation and calcination, the method of the invention avoids this problem.

SUMMARY OF THE INVENTION

In one aspect, the invention resides in a method of producing an aromatics alkylation catalyst comprising the steps of:

(a) synthesizing a layered oxide material MCM-56 in the presence of alkali and/or alkaline earth metal cations;

(b) prior to any calcination of the MCM-56, subjecting the MCM-56 produced in step (a) to ammonium ion exchange so as to at least partially replace the alkaline or alkaline earth metal cations associated with the MCM-56 with ammonium ions; then (c) heating the ammonium-exchanged MCM-56 to decompose the ammonium cations and convert the MCM-56 into the hydrogen form; and (d) after step (b), forming the MCM-56 into catalyst particles.

Preferably, step (d) precedes step (c).

Preferably, the forming step (d) includes the step of mixing the MCM-56 with an inorganic binder and then extruding the resultant mixture into catalyst particles.

In a further aspect, the invention resides in a process for alkylating an alkylatable aromatic compound with an alkylating agent in the presence of a catalyst produced by a method according to said one aspect of the invention.

DETAILED DESCRIPTION OF THE INVENTION

The present invention provides a novel method for producing a highly active MCM-56 aromatics alkylation catalyst and a process for effecting aromatics alkylation using the resultant catalyst.

As described in U.S. Pat. No. 5,362,697, MCM-56 is a layered oxide material which, in its calcined form is characterized by an X-ray diffraction pattern having the following lines:

| Interplanar d-spacing (A) | Relative Intensity |
|---|---|
| 12.4 ± 0.2 | vs |
| 9.9 ± 0.3 | m–s |
| 6.9 ± 0.1 | w |
| 6.2 ± 0.1 | s |
| 3.55 ± 0.07 | m–s |
| 3.42 ± 0.07 | vs |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, I/Io is one-hundredth of the intensity of the strongest line (the line at the d-spacing of 12.4A), above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history.

MCM-56 has a chemical composition which can be represented by the formula:

$$X_2O_3:(n)YO_2$$

wherein X is a trivalent element, such as aluminum, boron, iron and/or gallium, preferably aluminum, Y is a tetravalent element, such as silicon and/or germanium, preferably silicon, and n is less than 35, typically from 5 to 25, preferably from 10 to 20 and most preferably from 13 to 18. As-synthesized, MCM-56 has the following formula, on an anhydrous basis:

$$(0-2)M_2O:(1-2)R:X_2O_3:(n)YO_2$$

wherein M is an alkali and/or alkaline earth metal and R is an organic moiety and wherein the M and R components are associated with the material as a result of their presence during the synthesis of the MCM-56.

MCM-56 material is prepared from a reaction mixture containing sources of alkali or alkaline earth metal (M), e.g., sodium or potassium, cation, an oxide of trivalent element X, e.g., aluminum, an oxide of tetravalent element Y, e.g., silicon, directing agent (R), and water, said reaction mixture having a composition, in terms of mole ratios of oxides, within the following ranges:

| Reactants | Useful | Preferred |
|---|---|---|
| $YO_2/X_2O_3$ | 5 to 35 | 10 to 25 |
| $H_2O/YO_2$ | 0 to 70 | 16 to 40 |
| $OH^-/YO_2$ | 0.05 to 0.5 | 0.06 to 0.3 |
| $M/YO_2$ | 0.05 to 3.0 | 0.06 to 1.0 |
| $R/YO_2$ | 0.1 to 1.0 | 0.3 to 0.5 |

In the present synthesis method, the source of $YO_2$ preferably comprises at least about 30 wt. % solid $YO_2$ and more preferably at least about 40 wt. % solid $YO_2$. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors crystalline MCM-56 formation from the above mixture under the synthesis conditions described.

Directing agent R is selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof.

Crystallization of the MCM-56 can be carried out under either static or stirred conditions in a suitable reactor vessel, such as for example, polypropylene jars or teflon lined or stainless steel autoclaves, at a temperature from about 80° C. to about 225° C. It is critical, however, for synthesis of MCM-56 from the above reaction mixture to stop and quench the reaction prior to the onset of MCM-49 formation at the expense of MCM-56. Thereafter, the MCM-56 crystals are separated from the mother liquid, washed and recovered.

After recovery of the MCM-56 crystals, the as-synthesized material is subjected to a series of processing steps in order to produce the desired aromatics alkylation catalyst. The processing steps are conventional and include (1) removing the organic directing agent R, normally by calcination, (2) replacing the alkali or alkaline earth metal (M) cations with ammonium cations by ion exchange, (3) heating the ammonium-exchanged material to convert the MCM-56 to the catalytically active hydrogen form, (4) forming the crystals into catalyst particles, normally by extrusion and normally with the aid of a binder and (5) drying the catalyst particles. According to the invention, it has now been found that, contrary to conventional practice, it is critical in the formation of an MCM-56 aromatics alkylation catalyst that the ammonium ion exchange step is effected prior to any calcination and catalyst particle formation. Thus in the process of the invention, the as-synthesized MCM-56 crystals are ammonium-exchanged directly after recovery and prior to being subjected to any heating step. The ammonium-exchanged MCM-56 is then converted to the hydrogen form, either before or, more preferably, after, the crystals are formed into catalyst particles. In this way, the final catalyst is found to be significantly more active than a conventionally prepared MCM-56 catalyst in which ammonium exchange is effected after catalyst particle formation.

Where a binder is employed to assist in catalyst particle formation, the binder is preferably an inorganic oxide, such as alumina, silica, titania, zirconia, and silica-alumina, and preferably is present in an amount between about 2 and 80 wt % of the final catalyst.

The MCM-56 catalyst produced by the process of the invention is highly active in the alkylation of aromatic compounds. The term "aromatic" is used herein in its art-recognized sense which includes alkyl substituted and unsubstituted mono- and polynuclear compounds. Compounds of an aromatic character which possess a hetero atom are also useful provided they do not act as catalyst poisons under the reaction conditions selected.

Substituted aromatic compounds which can be alkylated herein must possess at least one hydrogen atom directly bonded to the aromatic nucleus. The aromatic rings can be substituted with one or more alkyl, aryl, alkaryl, alkoxy, aryloxy, cycloalkyl, halide, and/or other groups which do not interfere with the alkylation reaction.

Suitable aromatic hydrocarbons include benzene, naphthalene, anthracene, naphthacene, perylene, coronene, and phenanthrene.

Generally the alkyl groups which can be present as substituents on the aromatic compound contain from 1 to about 22 carbon atoms and usually from about 1 to 8 carbon atoms, and most usually from about 1 to 4 carbon atoms.

Suitable alkyl substituted aromatic compounds include toluene, xylene, n-propylbenzene, alpha-methylnaphthalene, ethylbenzene, cumene, mesitylene, durene, p-cymene, butylbenzene, pseudocumene, o-diethylbenzene, m-diethylbenzene, p-diethylbenzene, isoamylbenzene, isohexylbenzene, pentaethylbenzene, pentamethylbenzene; 1,2,3,4-tetraethylbenzene; 1,2,3,5-tetramethylbenzene; 1,2,4-triethylbenzene; 1,2,3-trimethylbenzene, m-butyltoluene; p-butyltoluene; 3,5-diethyltoluene; o-ethyltoluene; p-ethyltoluene; m-propyltoluene; 4-ethyl-m-xylene; dimethylnaphthalenes; ethylnaphthalene; 2,3-dimethylanthracene; 9-ethylanthracene; 2-methylanthracene; o-methylanthracene; 9,10-dimethylphenanthrene; and 3-methylphenanthrene. Higher molecular weight alkylaromatic hydrocarbons can also be used as starting materials and include aromatic hydrocarbons such as are produced by the alkylation of aromatic hydrocarbons with olefin oligomers. Such product are frequently referred to in the art as alkylate and include hexylbenzene, nonylbenzene, dodecylbenzene, pentadecylbenzene, hexyltoluene, nonyltoluene, dodecyltoluene and pentadecytoluene. Very often alkylate is obtained as a high boiling fraction in which the alkyl group attached to the aromatic nucleus varies in size from about $C_6$ to about $C_{12}$. When cumene or ethylbenzene is the desired product, the present process produces acceptably little by-products such as xylenes. The xylenes make in such instances may be less than about 500 ppm.

Reformate containing substantial quantities of benzene, toluene and/or xylene constitutes a particularly useful feed for the alkylation process of this invention.

The alkylating agents which are useful in the process of this invention generally include any aliphatic or aromatic organic compound having one or more available alkylating aliphatic groups capable of reaction with the alkylatable aromatic compound. Preferably, the alkylating group possesses from 1 to 5 carbon atoms. Examples of suitable alkylating agents are olefins such as ethylene, propylene, the butenes, and the pentenes; alcohols (inclusive of monoalcohols, dialcohols, trialcohols, etc.) such as methanol, ethanol, the propanols, the butanols, and the pentanols; aldehydes such as formaldehyde, acetaldehyde, propionaldehyde, butyraldehyde, and n-valeraldehyde; and alkyl halides such as methyl chloride, ethyl chloride, the propyl chlorides, the butyl chlorides, and the pentyl chlorides, and so forth.

Mixtures of light olefins are especially useful as alkylating agents in the alkylation process of this invention. Accordingly, mixtures of ethylene, propylene, butenes, and/or pentenes which are major constituents of a variety of refinery streams, e.g., fuel gas, gas plant off-gas containing ethylene, propylene, etc., naphtha cracker off-gas containing light olefins, refinery FCC propane/propylene streams, etc., are useful alkylating agents herein. For example, a typical FCC light olefin stream possesses the following composition:

|  | Wt. % | Mole % |
| --- | --- | --- |
| Ethane | 3.3 | 5.1 |
| Ethylene | 0.7 | 1.2 |
| Propane | 14.5 | 15.3 |
| Propylene | 42.5 | 46.8 |
| Isobutane | 12.9 | 10.3 |
| n-Butane | 3.3 | 2.6 |
| Butenes | 22.1 | 18.32 |
| Pentanes | 0.7 | 0.4 |

Reaction products which may be obtained from the process of the invention include ethylbenzene from the reaction of benzene with ethylene, cumene from the reaction of benzene with propylene, ethyltoluene from the reaction of toluene with ethylene, cymenes from the reaction of toluene with propylene, and sec-butylbenzene from the reaction of benzene and n-butenes.

The alkylation process of this invention is conducted such that the organic reactants, i.e., the alkylatable aromatic compound and the alkylating agent, are brought into contact with the zeolite MCM-56 catalyst composition in a suitable reaction zone such as, for example, in a flow reactor containing a fixed bed of the catalyst composition, under effective alkylation conditions. Such conditions include a temperature of from about 0° C. to about 500° C., and preferably between about 50° C. and about 250° C. The reaction generally takes place at pressures of from about 0.2 to about 250 atmospheres and preferably from about 5 to about 100 atmospheres. The molar ratio of alkylatable aromatic compound to alkylating agent can be from about 0.1:1 to about 50:1 and preferably can be from about 0.5:1 to about 10:1. Reaction is suitably accomplished utilizing a feed weight hourly space velocity (WHSV of between about 0.1 hr−1 and about 500 hr−1 and preferably from 0.5 hr−1 to about 100 hr−1. The latter WHSV is based upon the total weight of active catalyst (and binder if present).

The reactants can be in either the vapor phase or the liquid phase and can be neat, i.e., free from intentional admixture or dilution with other material, or they can be brought into contact with the zeolite catalyst composition with the aid of carrier gases or diluents such as, for example, hydrogen or nitrogen.

The alkylation process described herein can be carried out as a batch-type, semi-continuous or continuous operation utilizing a fixed or moving bed catalyst system. A particular embodiment entails use of a catalyst zone wherein the hydrocarbon charge is passed concurrently or countercurrently through a moving bed of particle-form catalyst. The latter, after use, is conducted to a regeneration zone where coke is burned from the catalyst in an oxygen-containing atmosphere (such as air) at elevated temperature, after which the regenerated catalyst is recycled to the conversion zone for further contact with the organic reactants.

When benzene is alkylated with ethylene to produce ethylbenzene, the alkylation reaction may be carried out in the liquid phase. Suitable liquid phase conditions can be selected by reference to the phase diagram for benzene. Liquid phase operation may be carried out at temperatures between about 150 to 320° C., usually in the range of about 200 to 260° C. Pressures during the liquid phase alkylation step may be as high as about 3000 psig, (about 20875 kPa abs.) and generally will not exceed 1000 psig (about 7000 kPa). The reaction may be carried out in the absence of hydrogen and accordingly the prevailing pressures are those of the reactant species. The space velocity may be from about 0.1 to 20 WHSV, based on the ethylene feed. Preferred space velocities for the liquid phase reaction include ranges, for example, from about 0.5 to about 3 WHSV, e.g., from about 0.75 to 2.0 WHSV based on the ethylene feed. The ratio of the benzene to the ethylene in the alkylation reactor may be from 1:1 to 30:1 molar, normally about 5:1 to 20:1 molar, and in most cases from about 5:1 to 10:1 molar.

When benzene is alkylated with propylene to produce cumene, the reaction may also take place under liquid phase conditions including a temperature of up to about 250° C., e.g., up to about 150° C., e.g., from about 10° C. to about 150° C.; a pressure of about 3000 psig or less, (about 20875 kPa abs.) e.g., from about 100 to 3000 kPa; and an aromatic hydrocarbon weight hourly space velocity (WHSV) of from about 5 $hr^{-1}$ to about 250 $hr^{-1}$, e.g., from 5 $hr^{-1}$ to about 50 $hr^{-1}$.

When conducting alkylation, various types of reactors can be used. For example, the process can be carried out in batchwise fashion by adding the catalyst and aromatic feedstock to a stirred autoclave, heating to reaction temperature, and then slowly adding the olefinic feedstock. A heat transfer fluid can be circulated through the jacket of the autoclave, or a condenser can be provided, to remove the heat of reaction and maintain a constant temperature. Large scale industrial processes may employ a fixed-bed reactor operating in an upflow or downflow mode or a moving-bed reactor operating with concurrent or countercurrent catalyst and hydrocarbon flows. These reactors may contain a single catalyst bed or multiple beds and may be equipped for the interstage addition of olefins and interstage cooling. Interstage olefin addition and more nearly isothermal operation enhance product quality and catalyst life. A moving-bed reactor makes possible the continuous removal of spent catalyst for regeneration and replacement by fresh or regenerated catalysts.

In a particular embodiment of the present invention, the alkylation process is carried out with addition of olefin in at least two stages. Preferably, there will be two or more catalyst beds or reactors in series, wherein at least a portion of the olefin is added between the catalyst beds or reactors. Interstage cooling can be accomplished by the use of a cooling coil or heat exchanger. Alternatively, interstage cooling can be effected by staged addition of the aromatic feedstock in at least two stages. In this instance, at least a portion of the aromatic feedstock is added between the catalyst beds or reactors, in similar fashion to the staged addition of olefin described above. The staged addition of aromatic feedstock provides additional cooling to compensate for the heat of reaction.

In a fixed-bed reactor or moving-bed reactor, alkylation is completed in a relatively short reaction zone following the introduction of olefin. Ten to thirty percent of the reacting aromatic molecules may be alkylated more than once. Transalkylation is a slower reaction which occurs both in the alkylation zone and in the remainder of the catalyst bed. If transalkylation proceeds to equilibrium, better than 90 wt. % selectivity to monoalkylated product is generally achieved. Thus, transalkylation increases the yield of monoalkylated product by reacting the polyalkylated products with additional benzene.

The alkylation reactor effluent contains the excess aromatic feed, monoalkylated product, polyalkylated products, and various impurities. The aromatic feed is recovered by distillation and recycled to the alkylation reactor. Usually a small bleed is taken from the recycle stream to eliminate unreactive impurities from the loop. The bottoms from the benzene distillation are further distilled to separate monoalkylated product from polyalkylated products and other heavies. In most cases, the recovered monoalkylated product must be very pure. In the production of cumene, for example, impurities, such as n-propylbenzene, butylbenzenes, ethylbenzene and alpha-methylstyrene, all should be reduced to low (e.g., <100–300 ppm) levels since they are converted to by-products during the oxidation process to make phenol from cumene. Only small amounts of n-propylbenzene can be removed by distillation, and so the catalyst should make very low levels of this impurity. It is important to have a feedstock which is relatively free of ethylene and butylenes to avoid ethylbenzene and butylbenzenes in the cumene product; these contaminants can be removed by distillation, but to do so greatly increases the amount of required downstream fractionation.

Additional monoalkylated product may be produced by transalkylation. The polyalkylated products may be recycled to the alkylation reactor to undergo transalkylation or they may be reacted with additional aromatic feed in a separate reactor. It may be preferred to blend the bottoms from the distillation of monoalkylated product with a stoichiometric excess of the aromatic feed, and react the mixture in a separate reactor over a suitable transalkylation catalyst. Where a separate transalkylation reactor is used, the catalyst may include MCM-56 formed by the method of the invention.

The invention will now be more particularly described with reference to the Examples.

EXAMPLE 1

Preparation of Improved MCM-56 Catalyst

As-synthesized MCM-56 crystals with $SiO_2/Al_2O_3$ ratio of 18 were ammonium exchanged with 1 M $NH_4NO_3$ solution (5 cc/g zeolite) for 1 hour and then filtered. The exchange was repeated two more times and then the filtered MCM-56 was washed thoroughly with deionised water. The washed material was then dried in an oven at 125° C. overnight. A physical mixture of 65 parts MCM-56 and 35 parts pseudoboehmite alumina powder was mulled to form a uniform mixture and formed into 1/16" cylindrical shape extrudates using a standard augur extruder. All components were blended based on parts by weight on a 100% solids basis. The extrudates were dried in an oven at 127° C., and were then nitrogen calcined at 480° C. for 3 hours followed by a 6 hour air calcination at 538° C. The physical properties of the catalyst are summarized in Table 1.

EXAMPLE 2

Preparation of Conventional MCM-56 Catalyst

A physical mixture of 65 parts as-synthesized MCM-56 (used in Example 1) and 35 parts pseudoboehmite alumina powder was mulled to form a uniform mixture and formed into 1/16" cylindrical shape extrudates using a standard augur extruder. All components were blended based on parts by weight on a 100% solids basis. The extrudates were dried overnight in an oven at 127° C. The dried extrudates were ammonium exchanged with 1 M NH$_4$NO$_3$ solution (10 cc/g catalyst) for 1 hour and then filtered. The exchange was repeated one more time and then washed thoroughly with deionised water. The washed material was then dried in an oven at 125° C. overnight. The dried extrudates were nitrogen calcined at 538° C. for 3 hours followed by a 8 hour air calcination at 538° C. The physical properties of the catalyst are summarized in Table 1.

TABLE 1

|  | Improved MCM-56 Example 1 | Conventional MCM-56 Example 2 |
| --- | --- | --- |
| Alpha activity | 124 | 137 |
| Sodium, ppm | 126 | 680 |
| n-Hexane sorption, wt % | 12.5 | — |
| Surface area, m2/g | 464 | 368 |
| Real density, g/cc | 2.56 | 2.42 |
| Particle density, g/cc | 0.69 | 0.74 |
| Pore volume, cc/g | 1.05 | 0.93 |

EXAMPLE 3

Liquid Phase EB Synthesis over Improved MCM-56

1.0 g of the improved MCM-56 catalyst of Example 1 was diluted with sand to 3 cc and charged to an isothermal, down-flow, fixed-bed, 0.95 cm outside diameter reactor. The catalyst was dried at 125° C. and 1 atm with 100 cc/min of flowing nitrogen overnight. The nitrogen supply was turned off and benzene was fed to the reactor at 45 WHSV for 1 hr and then at 16.7 WHSV while the reactor temperature and pressure were increased to 200° C. and 500 psig, respectively. After the desired temperature and pressure were reached, ethylene was introduced from a mass flow controller at 1.1 WHSV (5.5 benzene/ethylene molar ratio). After lining out, liquid products were collected in a cold-trap and analyzed off-line with a Varian 3700 GC. Offgas was analyzed with an on-line Carle refinery gas analyzer. Ethylene conversion was determined by measuring unreacted ethylene relative to feed ethylene. Total material balances were 100±2%. During the 9 day experiment, the effects of temperature (180–220° C.), ethylene WHSV (0.55 to 4.4 h$^{-1}$) were studied at 500 psig and 5.5 benzene/ethylene molar ratio. At the end of the run, no activity loss was observed.

The catalyst activity and selectivity for liquid phase EB synthesis (at 220° C., 500 psig, 5.5 benzene/ethylene molar ratio and 94% ethylene conversion) for the improved MCM-56 catalyst of Example 1 are compared with those of conventionally prepared MCM-56 in Table 2. The throughput-based relative activity (WHSV required to achieve constant ethylene conversion) indicates that the improved MCM-56 is 100% more active than the conventionally prepared MCM-56. Improved MCM-56 also had 1.2% higher EB selectivity with slightly higher overall alkylation selectivity than the conventionally prepared MCM-56.

TABLE 2

| Catalyst | Example 2 | Example 1 |
| --- | --- | --- |
| Ethylene WHSV | 2.2 | 4.4 |
| Ethylene Conversion, % | 93.7 | 93.8 |
| Days on Stream | 7.5 | 1.7 |

TABLE 2-continued

| Catalyst | Example 2 | Example 1 |
| --- | --- | --- |
| Product Distribution, wt % | | |
| EB | 91.96 | 93.12 |
| DiEB | 7.56 | 6.56 |
| TriEB | 0.38 | 0.24 |
| Xylenes | 0.00 | 0.00 |
| n-C$_3$—Bz + Cumene | 0.00 | 0.00 |
| sec-C$_4$—Bz | 0.05 | 0.07 |
| Heavies | 0.05 | 0.00 |

EXAMPLE 4

Although no aging was observed in Example 2, the catalyst was subjected to a regeneration procedure at the end of the run to assess its robustness. The catalyst was regenerated in situ at 1 atm in a mixture of air and N$_2$ (total flow of 200 cc/min): 25% of air for 30 min at 400° C.; 50%, 75%, and 100% of air for 30 min each at 450° C.; then 100% air at 538° C. for 2 hr. The temperature was decreased to 220° C. The regenerated catalyst was then tested for 3 days at 220° C., 500 psig, 1.1 ethylene WHSV, and 5.5 benzene/ethylene molar ratio. The regenerated catalyst had similar activity and selectivity when compared to the fresh catalyst. The DEB/EB molar ratio increased slightly after regeneration (0.04 at the end of run, 0.06 after regeneration).

EXAMPLE 5

0.25 g of the improved MCM-56 catalyst of Example 1 was diluted with sand to 3 cc and charged to an isothermal, down-flow, fixed-bed, 0.95 cm outside diameter reactor. The catalyst was dried at 125° C. and 1 atm with 100 cc/min of flowing N$_2$ for 3 hours. N$_2$ was turned off. Benzene was fed into the reactor at 180 WHSV for 1 hr and then at 55.7 WHSV while the reactor temperature and pressure were increased to 120° C. and 300 psig, respectively. After the desired temperature and pressure were reached, propylene was introduced from a syringe pump at 10 WHSV (3 benzene/propylene molar ratio). After lining out, liquid products were collected in a cold-trap and analyzed off-line with a Varian 3700 GC. Offgas was analyzed with an on-line Carle refinery gas analyzer. Propylene conversion was determined by measuring unreacted propylene relative to feed propylene. Total material balances were 100±2%. The test was conducted at 130° C., 300 psig and 3 benzene/propylene molar ratio with propylene WHSV adjusted between 10–40 h$^{-1}$. At the end of the run, no activity loss was observed.

The catalyst activity and selectivity for liquid phase cumene synthesis (at 130° C., 500 psig, 3 benzene/propylene molar ratio and 86% propylene conversion) for the improved MCM-56 catalyst of Example 1 are compared with those of conventionally prepared MCM-56 of example 2 in Table 3. The throughput-based relative activity (WHSV required to achieve constant propylene conversion) indicates that the improved MCM-56 is 33% more active than the conventionally prepared MCM-56. When compared to the conventionally prepared MCM-56, the improved MCM-56 had 3.6 wt % lower cumene selectivity, 0.4% higher overall alkylation selectivity, and 0.4% less propylene oligomers. Since di- and triisopropylbenzene can be converted to cumene in the transalkylator, whereas propylene oligomers irreversibly consume propylene, the higher overall alkylation selectivity observed with improved MCM-56 contributes to higher overall cumene yield.

TABLE 3

|  | Example 2 | Example 1 |
| --- | --- | --- |
| Propylene WHSV | 15.0 | 20.0 |
| Propylene Conversion, % | 85.9 | 86.1 |
| Days on Stream | 15.5 | 2.2 |
| Product Distribution, wt % | | |
| Cumene | 86.39 | 82.84 |
| Diisopropylbenzene | 12.09 | 15.33 |
| Triisopropylbenzene+ | 1.05 | 1.75 |
| Propylene Oligomers | 0.46 | 0.08 |
| n-$C_3$—Bz | 0.01 | 0.00 |

What is claimed is:

1. A method of producing an aromatics alkylation catalyst comprising the steps of:

(a) synthesizing a layered oxide material MCM-56 in the presence of alkali and/or alkaline earth metal cations;

(b) prior to any calcination of the MCM-56, subjecting the MCM-56 produced in step (a) to ammonium ion exchange so as to at least partially replace the alkali or alkaline earth metal cations associated with the MCM-56 with ammonium ions; then (c) heating the ammonium-exchanged MCM-56 to decompose the ammonium cations and convert the MCM-56 into the hydrogen form; and (d) after step (b), forming the MCM-56 into catalyst particles.

2. The method of claim 1, wherein step (d) precedes step (c).

3. The method of claim 1, wherein the forming step (d) includes the step of mixing the MCM-56 with an inorganic binder and then extruding the resultant mixture into catalyst particles.

* * * * *